F. E. SUDDOTH & W. T. S. WEAVER.
CLUTCH MECHANISM.
APPLICATION FILED APR. 17, 1909.
961,043.
Patented June 7, 1910.
2 SHEETS—SHEET 2.
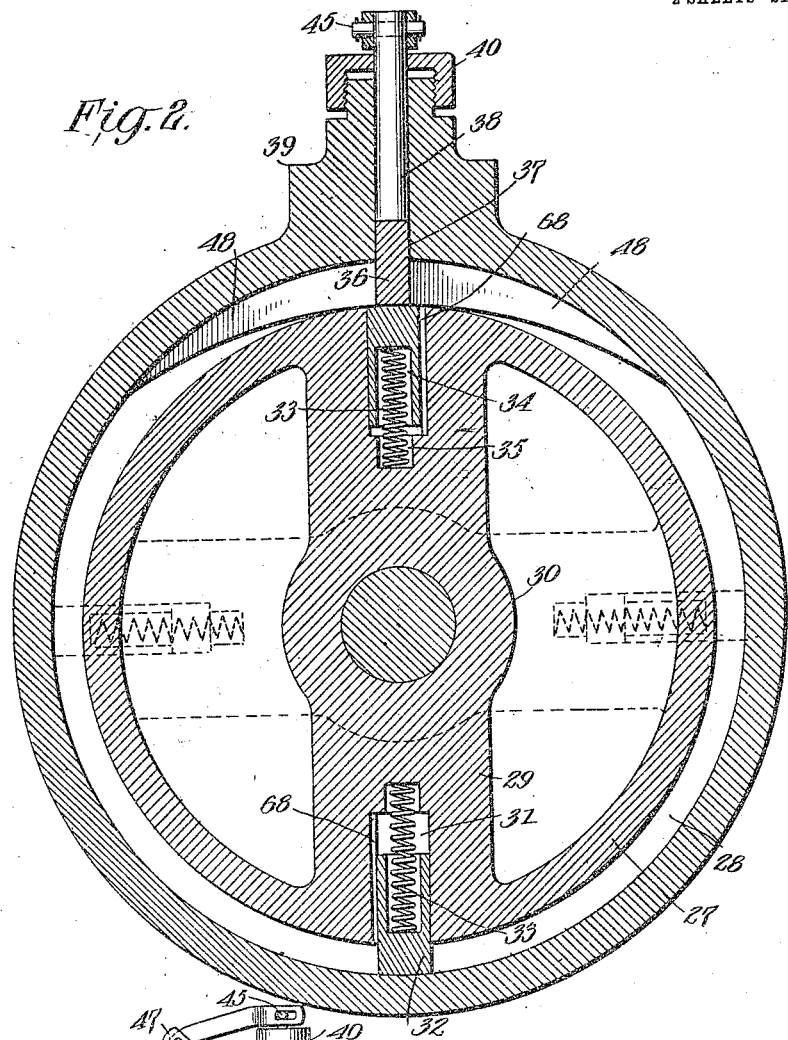
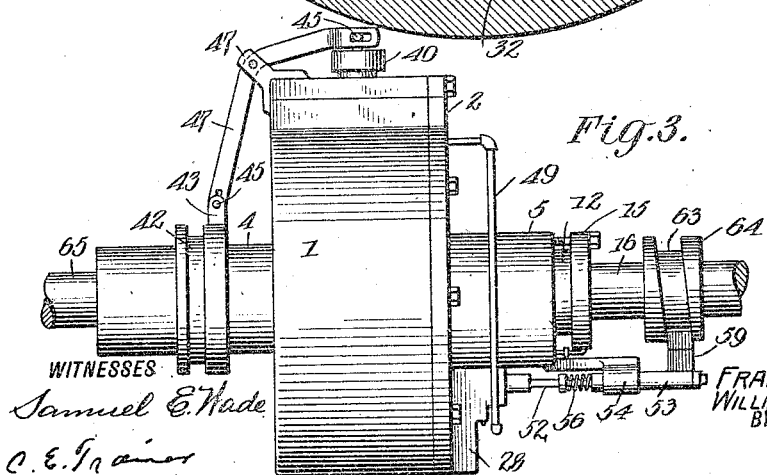
INVENTORS
FRANK E. SUDDOTH
WILLIAM T. S. WEAVER
ATTORNEYS

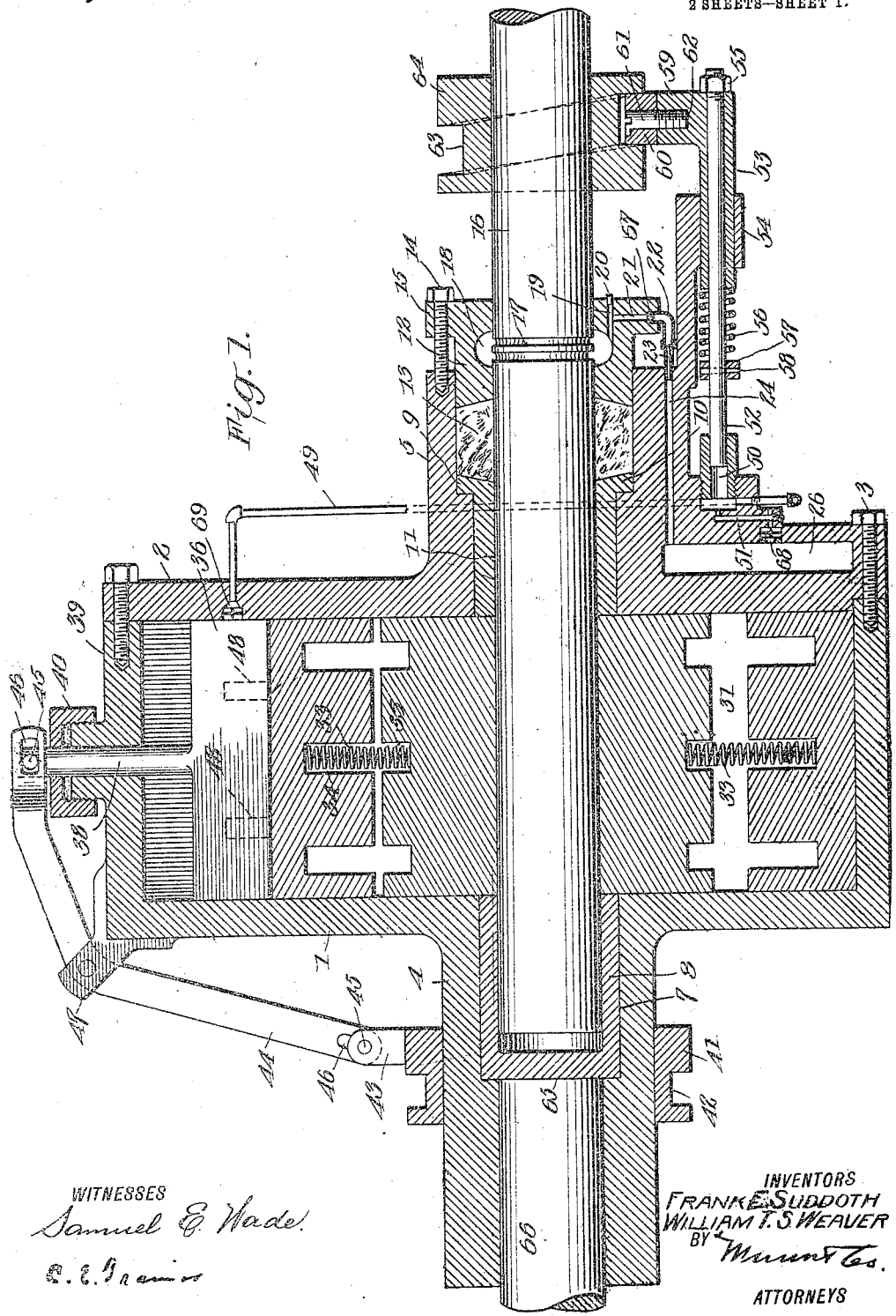

UNITED STATES PATENT OFFICE.

FRANK EDWARD SUDDOTH AND WILLIAM T. SHERMAN WEAVER, OF OMAHA, NEBRASKA.

CLUTCH MECHANISM.

961,043.  Specification of Letters Patent.  Patented June 7, 1910.

Application filed April 17, 1909. Serial No. 490,654.

*To all whom it may concern:*

Be it known that we, FRANK E. SUDDOTH and WILLIAM T. S. WEAVER, citizens of the United States, and residents of Omaha, in the county of Douglas and State of Nebraska, have invented certain new and useful Improvements in Clutch Mechanism, of which the following is a specification.

My invention is an improvement in clutch mechanism, and consists in certain novel constructions and combinations of parts, hereinafter described and claimed.

The object of the invention is to provide a mechanism especially adapted for automobiles, but equally advantageous in other machinery requiring a variable speed, whereby the relation of the speed of the driven means to the driving means may be varied within the widest possible limits.

Referring to the drawings forming a part hereof, Figure 1 is a central longitudinal section of the mechanism, Fig. 2 is a vertical section, and Fig. 3 is a reduced side view.

The embodiment of the invention shown, comprises a casing 1, cylindrical in cross section and cup-shaped as shown, the end being closed by a disk 2, which is secured to the casing by lag screws 3. Both the casing and the disk are provided with extended hubs 4 and 5 respectively.

The inner end of the bore of the hub 4 is enlarged as at 7, and a bushing 8 of brass. or other suitable material is received in the enlargement, while the outer end of the bore of the hub 5 is enlarged as at 9 to receive an annular flange 10, of a bushing 11 inserted in the bore of the hub. A gland or packing nut 12, is also received in the enlarged portion of the bore, and a packing 13, is arranged between the end of the bushing and the gland, which is secured in adjusted position by lag screws 14, traversing the flange 15 of the gland and the end of the hub.

A shaft 16 is journaled in the bushings, and adjacent to the gland the shaft is annularly grooved as at 17, the grooves registering with an annular recess 18 in the gland. The gland is provided with a longitudinal passage 19, leading from the recess, the passage having its outer end plugged as at 20, and communicating with a radial passage 21, which is connected by an elbow 22 with a nipple 23 projecting from a longitudinal passage 24 in the hub 5, and which communicates with a reservoir 26 in the disk, to be presently referred to. The shaft 16 is the driving shaft, and a disk or cylindrical rotor 27 is secured to the shaft within the casing, the external diameter of the disk being somewhat less than the internal diameter of the casing, to form an annular passage 28 between the inner face of the casing and the outer face of the disk. The rotor is hollow as shown and is provided with a diametrical web 29 in which is the bearing 30 for the driving shaft. At each end of the web the peripheral face of the rotor is transversely recessed as at 31, and a wing or vane 32 is arranged in each recess, the vane being normally retained in projected position by a spring 33, received in recesses 34 and 35 in the vane and the web respectively. The vanes extend the full width of the rotor, and contact at their ends with the side walls of the casing as shown in Fig. 1, and at their free edges with the inner face of the casing, each vane forming a fluid tight closure of the passage.

A valve 36 is arranged in the annular passage 28, and transversely thereof and is movable radially of the casing in a guideway 37, in the casing wall, and the valve is provided with a stem 38, extending through an integral boss 39 which is externally threaded and engaged by a gland or packing nut 40.

A collar 41 is slidably mounted on the hub 4, and is provided with an annular groove 42, for engagement by the usual operating lever (not shown), and with a lug 43, to which is pivoted one end of an elbow lever 44, the other end being pivoted to the outer end of the valve stem. It will be noticed that each end of the lever is slotted as at 46 and that the pivot pins 45, engage the slots thus providing for a lost motion connection. The casing is provided with a bracket 47, to which the elbow lever is pivoted. It will be evident from the description, that when the collar is moved longitudinally of the hub, the elbow lever will be oscillated to move the valve 37 radially of the casing, whereby to restrict the annular passage more or less, and the casing is provided with spaced parallel guides or cams 48 arranged transversely thereof for preventing engagement of the vanes therewith, the cams acting to depress the vanes below the free edge of the valve. The passage 28 is also somewhat enlarged at this point so that when the valve is open there will be no restriction of the passage.

The passage 28 is kept full of a light oil or other suitable fluid, which is supplied thereto from a pipe 49 connecting the passage with a pump cylinder 50, threaded into an opening in the hub 5, and having an inlet 51, leading from the reservoir 26 before mentioned. The pump cylinder is provided with a piston 52 passing loosely through a sleeve 53 movable in a bearing 54 integral with the hub 5, and the outer end of the rod is threaded and engaged by a nut 55, while a spring 56 is arranged between the inner end of the sleeve and a collar 57 pinned to the rod by a pin 58. The sleeve 53 has an integral boss 59, on which is journaled a roller 60 by means of a screw having a plain portion 61 within the roller, and a threaded portion 62 engaging the boss. The roller engages a cam groove 63 in a disk 64 secured to the driving shaft.

It will be observed from an inspection of Fig. 1 that the outer end of the bushing 8 is closed as at 65, and a stud shaft 66 is provided for supporting that side of the clutch.

In operation, the valve 36 being in its open position, whereby not to restrict the annular passage 28, and the passage being supplied with a suitable fluid, the rotation of the driving shaft or member will have no effect on the casing or driven member, there being no obstruction to the free passage of the oil or other liquid, which moves freely in front of the vanes. When however the collar 41 is shifted to move the valve into the passage to obstruct the same, the moving oil meets with resistance, which is transmitted to the valve, moving the same and as a consequence the casing. A part of the oil however passes the obstruction, so that only a part of the force exerted by vanes and transmitted by the oil is imparted to the casing, which for this reason moves at a lower rate of speed than the shaft. As the valve is moved still farther inwardly the free passage of the oil is more and more obstructed, and a gradually increasing moving force is transmitted to the casing, until the passage is entirely closed, and the casing and shaft moved in unison. Any oil escaping from the casing must pass out through the bushing 11, and will finally reach the grooves 17 and recess 18, from whence it will pass to the reservoir 26. From the reservoir it is drawn by the pump to return to the casing through the pipe 49. The pump will be operated only when there is a difference in speed between the shaft and the casing. When their speed is equal, they move as one piece, and consequently the position of the roller in the groove is not varied. As long as the casing is full, the piston will not reciprocate, the movement of the sleeve 53 being absorbed by the spring 56, which is sufficiently strong to hold the piston against the pressure of the oil in the pump cylinder, provided the pressure in the outlet pipe is below a predetermined value. When this value is attained the piston ceases to operate.

The passage 21 is provided with a check valve 67 to prevent the fluid from passing into said passage on the down stroke of the piston, and the recesses 31 of the web, are both provided with a groove 68 opening into the annular passage.

I claim:

1. A mechanism of the class described comprising a casing having a substantially cylindrical bore, a driving shaft journaled in the casing, a cylindrical rotor on the shaft and having its outer surface spaced apart from the inner surface of the casing, to form an annular passage for containing a fluid, said rotor being provided on its periphery with transverse radial recesses, vanes seated in the recesses and mounted to yield inwardly, and normally closing the annular passage, a valve movable radially of the casing, and closing the annular passage when in the innermost position, means for moving the valve, cams on the casing for engaging and depressing the vanes into the recesses, whereby to avoid contact of the valve therewith, a reservoir, means for conducting the leakage of the casing to the reservoir, a pump for withdrawing the fluid from the reservoir and returning it to the casing, a connection between the pump piston and the driving shaft, and a spring interposed in the connection and adapted to yield when the pressure in the pump exceeds a predetermined value.

2. A mechanism of the class described comprising a casing having a substantially cylindrical bore, a driving shaft journaled in the casing, a cylindrical rotor on the shaft and having its outer surface spaced apart from the inner surface of the casing, to form an annular passage for containing a fluid, said rotor being provided on its periphery with transverse radial recesses, vanes seated in the recesses and mounted to yield inwardly, and normally closing the annular passage, a valve movable radially of the casing, and closing the annular passage when in the innermost position, means for moving the valve, cams on the casing for engaging and depressing the vanes into the recesses, whereby to avoid contact of the valve therewith, a reservoir, means for conducting the leakage of the casing to the reservoir, means for withdrawing the fluid from the reservoir and returning it to the casing, a connection between the driving shaft and said means for operating the same, and a spring interposed in the connection and adapted to yield when the pressure in the casing attains a predetermined value.

3. In a fluid clutch, a cylindrical casing for containing a fluid and provided with opposite end bearings, a driving shaft journaled in the bearings, vanes radially movable with respect to the shaft, springs for supporting the vanes, manually operated means for restricting the annular passage between the shaft and the inner wall of the casing for the purpose set forth, one of said bearings being closed at its outer end, an annular recess at the other end for receiving leakage from the casing through the open bearing, a reservoir to which the recess delivers, a pump for withdrawing the leakage from the reservoir and returning it to the casing, and means operated by the difference in speed between the shaft and the casing for operating the pump.

4. In a fluid clutch, a cylindrical casing for containing a fluid and provided with opposite end bearings, a driving shaft journaled in the bearings, vanes radially movable with respect to the shaft, springs for supporting the vanes, manually operated means for restricting the annular passage between the shaft and the inner wall of the casing for the purpose set forth, one of said bearings being closed at its outer end, an annular recess at the other end for receiving leakage from the casing through the open bearing, a reservoir to which the recess delivers, a pump for withdrawing the leakage from the reservoir and returning it to the casing, means operated by the difference in speed between the shaft and the casing for operating the pump, and means between the pump and the operating means for permitting the pump to cease acting when the pressure in the casing exceeds a predetermined value.

5. In a fluid clutch, a casing for containing the fluid, and provided with oppositely arranged bearings, a driving shaft journaled in the bearings, a fluid operated means for connecting the shaft with the casing, one of said bearings being closed at its outer end, means at the outer end of the other bearing for receiving the leakage from the casing, a pump for withdrawing said leakage and returning it to the casing, means operated by the difference in speed between the shaft and the casing for operating the pump, and means between the pump and the operating means for permitting the pump to cease acting when the pressure in the casing exceeds a predetermined value.

FRANK EDWARD SUDDOTH,
WILLIAM T. SHERMAN WEAVER.

Witnesses:
FERD. KUNES,
W. F. WAHL.